United States Patent
Becker et al.

(10) Patent No.: US 10,095,643 B2
(45) Date of Patent: Oct. 9, 2018

(54) DIRECT MEMORY ACCESS CONTROL DEVICE FOR AT LEAST ONE COMPUTING UNIT HAVING A WORKING MEMORY

(71) Applicant: Robert Bosch GmbH, Stuttgart (DE)

(72) Inventors: Eugen Becker, Ludwigsburg (DE); Axel Aue, Korntal-Muenchingen (DE); Eckart Schlottmann, Affalterbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/479,915

(22) Filed: Apr. 5, 2017

(65) Prior Publication Data
US 2017/0300435 A1    Oct. 19, 2017

(30) Foreign Application Priority Data

Apr. 13, 2016   (DE) .................. 10 2016 206 109

(51) Int. Cl.
| | |
|---|---|
| *G06F 13/28* | (2006.01) |
| *G06F 13/10* | (2006.01) |
| *G06F 13/40* | (2006.01) |
| *G06F 13/24* | (2006.01) |
| *G06F 12/1081* | (2016.01) |

(52) U.S. Cl.
CPC .......... *G06F 13/28* (2013.01); *G06F 12/1081* (2013.01); *G06F 13/24* (2013.01); *G06F 13/4068* (2013.01)

(58) Field of Classification Search
CPC ........ G06F 13/24; G06F 13/28; G06F 13/282; G06F 13/285; G06F 13/287; G06F 13/30; G06F 12/10; G06F 12/0835; G06F 12/1081; G06F 13/4068
See application file for complete search history.

(56) References Cited

U.S. PATENT DOCUMENTS

| | | | | |
|---|---|---|---|---|
| 4,067,059 | A * | 1/1978 | Derchak | G06F 13/285 710/28 |
| 5,018,098 | A * | 5/1991 | Taniai | G06F 9/268 710/22 |
| 5,970,069 | A * | 10/1999 | Kumar | H04L 69/12 370/401 |
| 6,125,399 | A * | 9/2000 | Hamilton | H04L 29/06 370/392 |
| 6,728,892 | B1 * | 4/2004 | Silvkoff | G06F 1/3209 713/320 |

(Continued)

*Primary Examiner* — Thomas J Cleary
(74) *Attorney, Agent, or Firm* — Norton Rose Fulbright US LLP; Gerard Messina

(57) ABSTRACT

A direct memory access control device for at least one computing unit includes a terminal for connecting the direct memory access control device to a bus system that connects the computing unit to a working memory, and processing circuitry configured to read out, from a source module connected to the bus system, first data of at least one information block stored at least temporarily in the source module, ascertain a target address in the working memory for the at least one information block as a function of the first data and of configuration information, and transmit the at least one information block from the source module to the target address using a direct memory access by the source module to the working memory.

23 Claims, 4 Drawing Sheets

(56) References Cited

U.S. PATENT DOCUMENTS

| | | | | |
|---|---|---|---|---|
| 6,757,746 B2* | 6/2004 | Boucher | ................... | G06F 5/10 709/245 |
| 2001/0018732 A1* | 8/2001 | Nakagoshi | .............. | G06F 15/17 712/11 |
| 2002/0181456 A1* | 12/2002 | Katayama | ............. | H04L 49/351 370/389 |
| 2003/0120836 A1* | 6/2003 | Gordon | ............... | G06F 11/1004 710/22 |
| 2003/0172224 A1* | 9/2003 | Gulick | ................ | G06F 12/0879 711/1 |
| 2005/0138236 A1* | 6/2005 | Hwang | ................... | G06F 13/28 710/24 |
| 2008/0043732 A1* | 2/2008 | Desai | ................. | H04L 49/109 370/389 |
| 2008/0147907 A1* | 6/2008 | Triece | ................... | G06F 13/285 710/22 |
| 2010/0005199 A1* | 1/2010 | Gadgil | ................... | G06F 13/28 710/22 |
| 2012/0017064 A1* | 1/2012 | Sasaki | ................ | H04L 67/1097 711/206 |
| 2014/0366035 A1* | 12/2014 | Yasuda | ................ | G06F 9/5083 718/105 |

* cited by examiner

DIRECT MEMORY ACCESS CONTROL DEVICE FOR AT LEAST ONE COMPUTING UNIT HAVING A WORKING MEMORY

CROSS-REFERENCE TO RELATED APPLICATIONS

The present application claims priority under 35 U.S.C. § 119 to DE 10 2016 206 109.7, filed in the Federal Republic of Germany on Apr. 13, 2016, the content of which is hereby incorporated by reference herein in its entirety.

FIELD OF THE INVENTION

The present invention relates to a direct memory access control device and a corresponding method.

BACKGROUND

Computing units, for example processors, are commercially known that have one or more processor cores and that can access a working memory. In addition, computer systems that have one or more such computing units standardly include a plurality of additional units that work together with the computing unit, such as input/output modules (I/O) and the like. At least some of the stated elements of the computer system can exchange data with one another via a common, preferably parallel, bus. In addition, methods are known for a so-called direct memory access (DMA) whereby the data exchange via the common bus can be improved.

SUMMARY

Example embodiments of the present invention are directed to a direct memory access control device and to a corresponding method. The various individual features described below can be important for the present invention both by themselves and in various combinations, without this being again explicitly indicated.

The present invention relates to a direct memory access control device for at least one computing unit having a working memory, the direct memory access control device including a terminal for connecting the direct memory access control device to a bus system that connects the computing unit to the working memory. The direct memory access control device is configured to: read out first data from a source module connected to the bus system, the first data being assigned to at least one information block stored at least temporarily in the source module, ascertain a target address in the working memory for the at least one information block as a function of the first data and as a function of configuration information, and transmit the at least one information block from the source module to the target address, using a direct memory access by the source module to the working memory.

The stated at least one information block can include "useful data" and/or control information, and for example can also form entire data packets, such as can be received by the source module from other units via a bus system (differing from the bus system described above) and/or via a data network.

The computing unit (e.g., a CPU) can include one or more processor cores (computing cores), which are also referred to as computing units in the following. The processor cores, or computing units, can be situated in a common component (integrated circuit) or in separate components.

The working memory can be realized as a central working memory that can be used in common by the processor cores, and/or a separate working memory can be provided for each of the processor cores. This working memory can be situated, together with the respective processor core, in a common component (internal), or can be physically separated therefrom (external).

The target address is for example an individual address in the working memory, the direct memory access control device being fashioned to continually incrementally increase the target address, in a suitable and known manner, as a function of the information block to be transmitted.

In an example embodiment, the configuration information is specified by a table (configuration table), a matrix, or the like. In a further example embodiment, it is specified via the stated configuration information in what way the first data are to be interpreted for ascertaining the target address. The configuration information can also include filter criteria that can be applied to the first data, e.g., for the selection of data.

The source module can be an arbitrary unit that has at least one information block that can be transmitted to the target address in the working memory.

Preferably, but not necessarily, the direct memory access control device is realized as hardware, i.e., by one or more discrete and/or integrated electronic components. In an advantageous specific embodiment, a conventional direct memory access control device can be supplemented with the functionality according to the present invention.

In an example embodiment, the direct memory access control device is a separate unit that is used as a supplement to a direct memory access control device known from the existing art.

In a further example embodiment, the direct memory access control device is fashioned to receive a trigger signal, a control bit, or some other signal from the source module, whereby the direct memory access control device can be caused to read the first data from the source module connected to the bus system. In this way, a periodic querying (polling) of the source module by the direct memory access control device can be dispensed with, which can advantageously accelerate and/or simplify the operation of the direct memory access control device.

The present invention has the advantage that a data transmission, in particular the transmission of the at least one information block from the source module to the target address, is possible without cooperation by the computing unit or a respective processor core. This can save computing time, because accesses of the computing unit to its peripheral equipment are in general comparatively slow. In this way, the operation of the computing unit, or of a computing system having the computing unit, can be improved overall.

A further advantage is that the direct memory access control device increases the performance of those source modules that were not explicitly designed for operation with a so-called multicore system (i.e., a computing unit having a plurality of processor cores), but rather were developed merely with the design goal of communication with a single processor core.

In a further embodiment, the source module includes a communication module, in particular a CAN module, an MCAN module, a FlexRay module, and/or an Ethernet module. These modules can particularly advantageously be used together with the direct memory access control device. CAN stands for Controller Area Network. Here, the letter M characterizes an optional manufacturer-specific added name. FlexRay characterizes a serial, deterministic, error-tolerant field bus system, in particular for use in motor vehicles. In other specific embodiments, the source module can also have, or be, a storage unit. In a further specific embodiment, the source module can also include, or be, a memory, e.g., a working memory (RAM, random access memory).

In addition, it can be provided that the first data are useful data and/or metadata of the information block. The metadata can for example include a so-called CAN-ID, if the source module includes a CAN module, or the metadata can include for example a so-called minislot number, if the source module includes a FlexRay module. In this way, as a function of a respective configuration the direct memory access control device can advantageously use a plurality of possibilities for ascertaining the target address in the working memory.

In addition, it can be provided that the information block in the source module characterizes a message received by the source module. For example, the message is received by the source module, via a bus system that is separate from the computing unit and the direct memory access control device (e.g., CAN bus), from another bus subscriber of this bus system. This message can advantageously be sent to the target address of the working memory by the direct memory access control device.

In a further embodiment, the configuration information is localized inside and/or outside the direct memory access control device. For example, the configuration information is stored in volatile or nonvolatile fashion in an electronic component that includes the direct memory access control device. In addition or alternatively, the configuration information can for example be localized in a region of the working memory or in a memory comparable thereto. In this way, the configuration information can advantageously be specified in multiple ways, for example by the computing unit.

In addition, it can be provided that the direct memory access control device is fashioned to ascertain, in addition to the ascertaining of the target address, a computing unit intended for the transmission of the at least one information block and/or a working memory (or working memory region or working memory unit) intended for the transmission of the at least one information block. This preferably takes place as a function of the first data and/or as a function of the configuration information. This is particularly advantageous if the computing unit includes a plurality of processor cores, whereby the operation of the computing unit or of the computing system including the at least one computing unit can be improved.

In a further embodiment, the direct memory access control device is fashioned to ascertain the target address as a function of at least one absolute first memory address in the working memory and/or at least one relative second memory address in the working memory. The choice as to whether the absolute first memory address and/or the relative second memory address is used preferably takes place as a function of the configuration information further described above, and/or as a function of the first data. In this way, the possibilities of the direct memory access control device are advantageously expanded.

Here, the absolute first memory address is for example a specified address in the working memory, the first memory address being capable of being increased incrementally, for example by the direct memory access control device, until the entire information block has been transmitted into the working memory.

Here, the relative second memory address is characterized for example by a write pointer for storing the information block in a ring buffer (ring memory). For example, the ring buffer includes a specified memory region in the working memory having a fixed length, and the write pointer can cyclically run through the memory region. A read pointer for example controlled by a processor core can follow the write pointer with a time delay, and can thus supply the information block incrementally to a further processing controlled by the processor core.

In addition, in an exampled embodiment, the direct memory access control device is fashioned to set at least one control bit in the at least one information block, and/or to trigger an interrupt request at the computing unit and/or at a processor core of the computing unit. Preferably, but not necessarily, the interrupt request relates only to that processor core that is provided as receiver for the respective information block. In this way, the computing unit, or the computing system including the at least one computing unit, can react particularly quickly to the transmission of the information block to the working memory. The stated control bit is for example a so-called new flag.

In a further embodiment, the direct memory access control device is fashioned to transmit a control bit, or acknowledge bit, to the source module, after a respective information block has successfully been transmitted by the direct memory access control device from the source module to the working memory. In this way, a memory region reserved temporarily in the source module for the information block can advantageously again quickly be released, thus being available for possible further transmissions.

In addition, example embodiments of the present invention relate to a method for operating the direct memory access control device for at least one computing unit having a working memory, the direct memory access control device having a terminal for connecting the direct memory access control device to a bus system that connects the computing unit to the working memory. The method includes: reading out first data from a source module connected to the bus system, the first data being assigned to at least one information block stored at least temporarily in the source module; ascertaining a target address in the working memory for the at least one information block as a function of the first data and as a function of configuration information; and transmitting the at least one information block from the source module to the target address using a direct memory access by the source module to the working memory.

This results in advantages that are comparable to those described above in relation to the direct memory access control device.

In an embodiment of the method, the source module includes a communication module, in particular a CAN module, an MCAN module, a FlexRay module, and/or an Ethernet module. In a further specific embodiment, the source module can also include, or be, a memory, e.g., a working memory (RAM).

In a further embodiment of the method, the first data are useful data and/or metadata of the information block.

In a further embodiment of the method, the information block in the source module characterizes a message received by the source module.

In a further embodiment of the method, supplementary to the ascertaining of the target address, a computing unit intended for the transmission of the at least one information block and/or a working memory intended for the transmission of the at least one information block are ascertained.

In a further embodiment of the method, the target address is ascertained as a function of at least one absolute first memory address in the working memory and/or at least one relative second memory address in the working memory.

In a further embodiment of the method, at least one control bit is set in the at least one information block and/or an interrupt request is triggered at the computing unit and/or at a processor core of the computing unit.

For the described embodiments of the method, there also result advantages comparable to those already described above for the corresponding embodiments of the direct memory access control device.

In the following, exemplary specific embodiments of the present invention are explained with reference to the drawings, in which the same reference characters have been used for functionally equivalent elements and quantities, even in the case of different specific embodiments.

DETAILED DESCRIPTION

Figure 1:
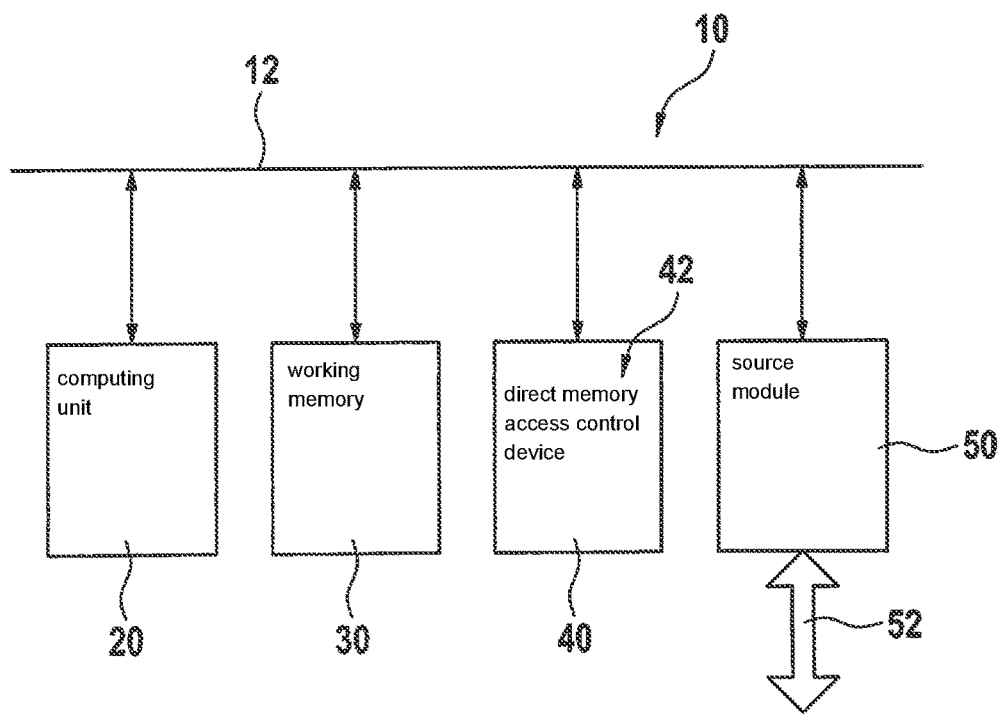
FIG. 1 shows a greatly simplified schematic diagram of a computer system having a bus, according to an example embodiment of the present invention.

FIG. 1 schematically shows a greatly simplified schematic diagram of a computer system 10 having a computing unit 20, a working memory 30, and a direct memory access control device 40, each connected to a bus system 12 that connects computing unit 20 to working memory 30. Bus system 12 can for example, like one or more of the components 20, 30, 40, 50, be situated on a semiconductor component (chip) (network-on-chip). In addition, direct memory access control device 40 includes configuration information 42, explained in further detail below in relation to FIG. 2. In addition, FIG. 1 shows a source module 50 connected to bus system 12. In the present case, a CAN bus 52 is connected to source module 50.

Figure 2:
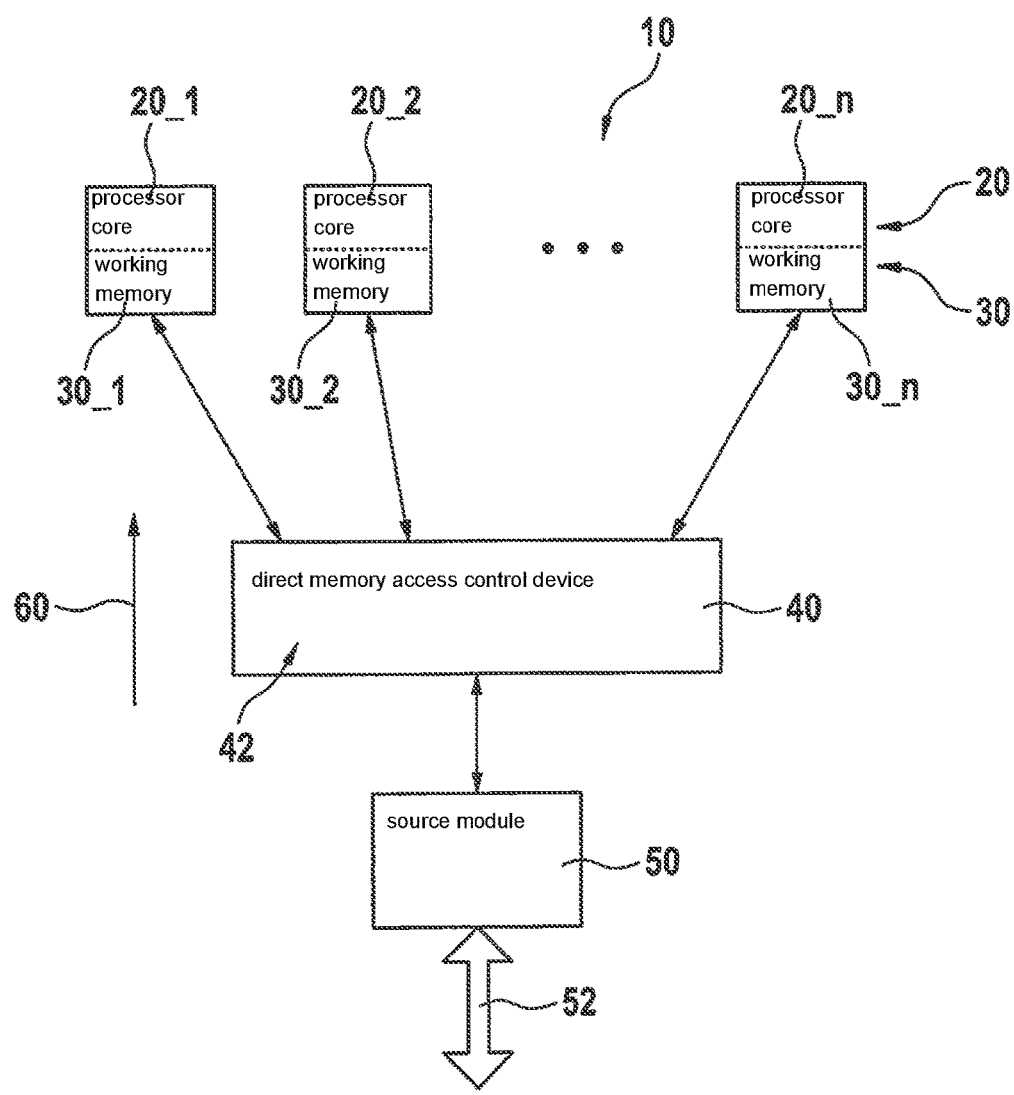
FIG. 2 shows the computer system of FIG. 1 having a plurality of computing units and working memory units assigned to each of the computing units, according to an example embodiment of the present invention.

FIG. 2 shows computer system 10, which in the illustrated example includes a computing unit 20 having a plurality of processor cores 20_1 through 20_n and working memory units 30_1, 30_2 through 30_n, each respectively assigned to respective ones of processor cores 20_1 through 20_n.

In the following, processor cores 20_1 through 20_n are also equivalently referred to as computing units 20_1 through 20_n. In the following, working memory units 30_1, 30_2 through 30_n are also referred to collectively as working memory 30. As a function of a specific embodiment, however, working memory 30 can also be formed as a central element of computing system 10, all computing units 20_1 through 20_n having read and write access to this working memory 30.

In a specific embodiment, source module 50 is fashioned for operation with a computing unit 20 that includes only a single processor core 20_1 through 20_n. In a further specific embodiment, source module 50 is fashioned for operation with a plurality of processor cores 20_1 through 20_n. Both specific embodiments of source module 50 can be used alternatively in the computer system 10 of FIG. 1 or 2.

Working memory 30 or working memory units 30_1, 30_2 through 30_n can for example be an external RAM, or can be an internal RAM belonging to computer unit 20 or to computing units 20_1, 20_2, 20_n.

Computing unit 20, working memory units 30_1 through 30_n, direct memory access control device 40 and source module 50 are connected to one another via common bus system 12 (see FIG. 1), via which information blocks 60 can be exchanged. Information blocks 60 can include useful data and/or items of control information.

In the present case, only those information blocks 60 are considered that are transmitted, or that are to be transmitted, from source module 50 to working memory 30, or to working memory units 30_1 through 30_n (so-called Rx operation). Nonetheless, source module 50, or communication module 50, can of course also be fashioned to receive information blocks 60 from working memory 30 via bus system 12 for transmission via CAN bus 52 (so-called Tx operation).

Bus system 12 can for example be fashioned as a parallel bus system 12 having an address bus having a first number of address lines, and a data bus having a second number of data lines.

The double arrows shown in FIG. 2 between working memory units 30_1, 30_2 through 30_n and direct memory access control device 40, as well as between direct memory access control device 40 and source module 50, in the present case characterize a respective functional allocation, and only to a limited extent a respective physical connection.

In the present case, source module 50 includes a communication module 50, in particular a CAN module or MCAN module. Correspondingly, in the following the terms "source module" and "communication module" are used with equivalent meaning. Source module 50 or communication module 50 or the MCAN module can communicate with CAN bus 52 connected to communication module 50, to which a plurality (not shown) of CAN bus subscribers, designated in the present case as "logical units," can be connected. In a specific embodiment, source module 50 or communication module 50 is a FlexRay module and/or an Ethernet module. In a further specific embodiment, the source module can also include, or be, a memory, e.g., a working memory (RAM).

For example, the MCAN module or communication module 50 includes, inter alia, the following subcircuits: an interface management logic for bus system 12, a transmit buffer, one or more receive buffers, a bit stream processor, an error management logic, a transceive logic, a bit timing logic, and/or a line interface logic for a connected CAN bus system.

Inter alia, FIG. 2 thus shows direct memory access control device 40 for at least one computing unit 20 having a working memory 30, direct memory access control device 40 having a terminal for connecting direct memory access control device 40 to bus system 12 that connects computing unit 20 to working memory 30. Here, direct memory access control device 40 is fashioned in order to execute the following steps: reading out 102 (see FIG. 4) of first data from source module 50 connected to bus system 12, the first data being assigned to at least one information block 60 stored at least temporarily in source module 50; ascertaining 104 (see FIG. 4) of a target address 82' (see FIG. 3) in working memory 30 or in working memory units 30_1 through 30_n for the at least one information block 60 as a function of the first data and as a function of configuration information 42; and transmission 108 (see FIG. 4) of the at least one information block 60 from source module 50 to target address 82', using a direct memory access by source module 50 to working memory 30.

In a specific embodiment, the first data are useful data and/or metadata of information block 60. In the present case, information block 60 in source module 50 characterizes a message received by source module 50, which can therefore for example be received via CAN bus 52 connected to communication module 50.

In a further specific embodiment, configuration information 42 is localized inside and/or outside direct memory access control device 40. In the present case, configuration information 42 characterizes how the first data for ascertaining 104 of target address 82' are to be interpreted. For example, configuration information 42 is stored in volatile or non-volatile fashion in an electronic component including direct memory access control device 40. In a specific embodiment, configuration information 42 is localized in a region of working memory 30 or 30_1 through 30_$n$ or in a memory comparable thereto.

In the present case, direct memory access control device 40 is fashioned, in addition to the ascertaining 104 of target address 82', a computing unit 20_1 through 20_$n$ intended for the transmission of the at least one information block 60 and/or a working memory 30 or 30_1 through 30_$n$ intended for the transmission of the at least one information block 60. This preferably likewise takes place as a function of the first data and/or configuration information 42.

In a specific embodiment, direct memory access control device 40 is fashioned to set at least one control bit in the at least one information block 60 and/or to trigger an interrupt request at computing unit 20 and/or at a processor core 20_1 through 20_$n$ of computing unit 20. Preferably, but not necessarily, the interrupt request relates only to that processor core 20_1 through 20_$n$ that is provided as receiver for the respective information block 60.

In a further specific embodiment, direct memory access control device 40 is fashioned to transmit a control bit, or acknowledge bit, to source module 50 after a respective information block 60 has successfully been transmitted from source module 50 to working memory 30, or 30_1 through 30_$n$, by direct memory access control device 40. In this way, a memory region reserved in source module 50 temporarily for information block 60 can quickly be released again, and is thus available for possible further transmissions.

In a further specific embodiment, direct memory access control device 40 is fashioned to ascertain target address 82' as a function of at least one absolute first memory address in working memory 30 or 30_1 through 30_$n$ and/or at least one relative second memory address in working memory 30 or 30_1 through 30_$n$. This preferably also takes place as a function of the first data and/or configuration information 42.

Here, the absolute first memory address is for example a specified address in working memory 30 or 30_1 through 30_$n$, it being possible to increase the first memory address incrementally until the entire information block 60 has been transmitted. Here, the relative second memory address is for example a write pointer 82 for storing information block 60 in a ring buffer memory 80.

Figure 3:
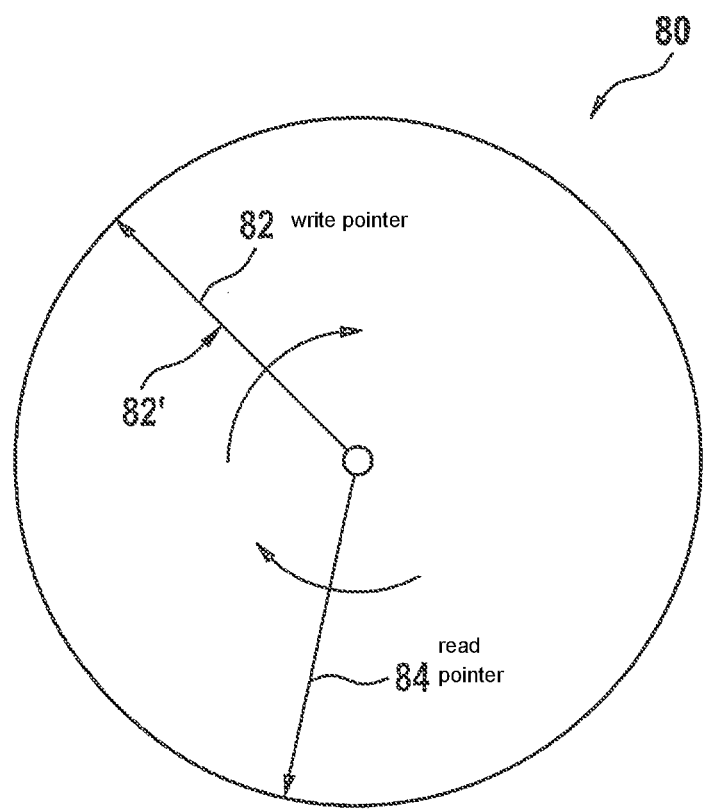
FIG. 3 shows a schema for a ring buffer memory according to an example embodiment of the present invention.

Using the stated absolute first memory address, information block 60 can be stored completely (permanently if warranted) in a specified memory region of working memory 30 or 30_1 through 30_$n$. Using the relative second memory address, information block 60 can for example be intermediately stored in a ring buffer memory 80 (FIG. 3). Other types of memory, such as a queue memory (wait line) or a stack memory, are also conceivable.

In a specific embodiment, computing unit 20 and/or working memory 30 and/or a respective information block 60, inter alia, are characterized by the following essentially self-explanatory quantities, items of control information, and/or items of configuration information 42:

CAN_ID (1 ... $n$); Data NEW.

where:
CAN_ID (1 ... n)—ID of a message transmitted by DMA
Data—data of the associated ID
NEW—means that new data were received; is set for example by DMA (direct memory access control device) and reset by CPU.

In a specific embodiment, direct memory access control device 40 and/or a respective information block 60, inter alia, are characterized by the following essentially self-explanatory quantities, items of control information, and/or items of configuration information 42:

SrcAddr; Len; CriteriaDefinition(1 ... $N$); TargetAddr; CPUx; Intr.

where
SrcAddr—source address;
Len—length, or how many bytes are to be transmitted;
TargetAddr—target address (for example in working memory 30);
CriteriaDefinition—e.g., CAN_ID of a message; can be used as a criterion for the decision to which CPU (target address) the data are to be transmitted. Further possible criteria: MiniSlot ID, protocol identification, etc.
CPUx—after the message has been received, at the CPUx the interrupt is triggered: configuration bit;
Intr—interrupt configuration bit; means: trigger interrupt after a message has been received.

FIG. 3 schematically shows a ring buffer memory 80 that for example includes a memory region of fixed length, specified in working memory 30 or 30_1 through 30_$n$. Ring buffer memory 80 has a write pointer 82 that characterizes a current address at which a currently transmitted element of information block 60 can be written to ring buffer memory 80. Here, write pointer 82 simultaneously characterizes a target address 82' for the at least one information block 60.

A read pointer 84, controlled for example by computing unit 20 or 20_1 through 20_$n$, can follow write pointer 82 with a time delay, and can thus supply information block 60 incrementally to a further processing controlled by computing unit 20 or 20_1 through 20_$n$. Write pointer 82 and read pointer 84 can cyclically run through the memory region assigned to ring buffer memory 80.

Figure 4:
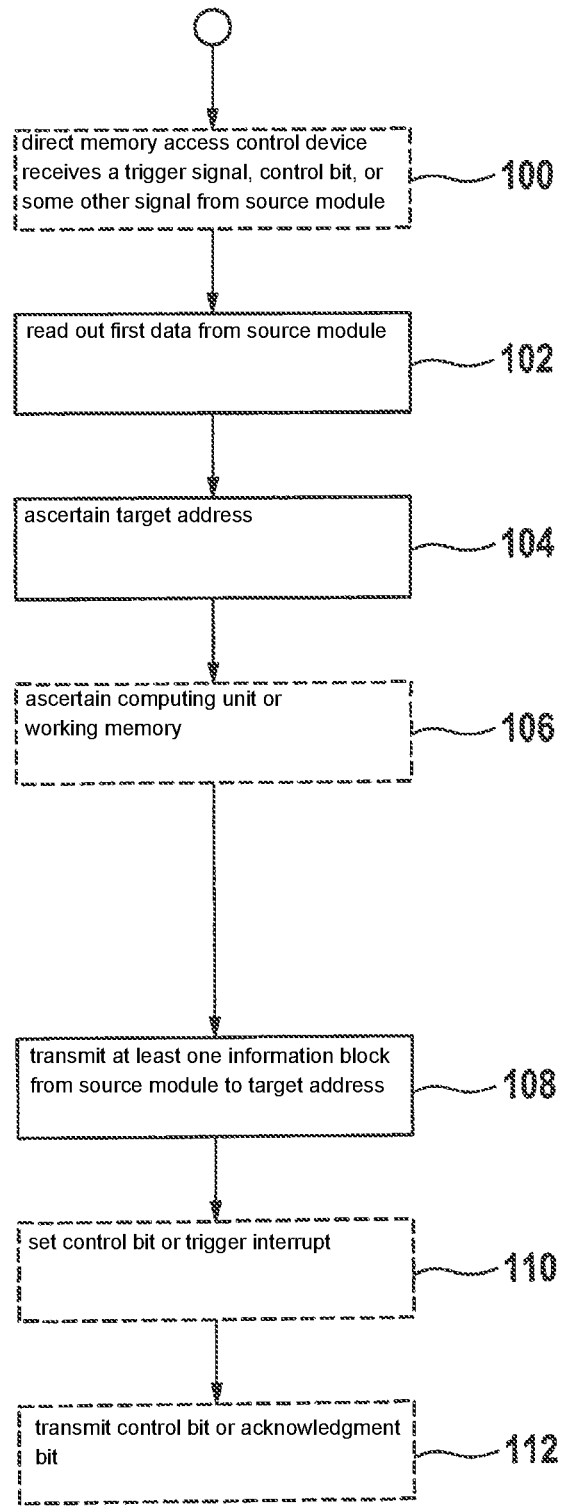
FIG. 4 is a flowchart that illustrates a method for operating a direct memory access control device of the computer system according to FIG. 2 for carrying out a direct memory access, according to an example embodiment of the present invention.

FIG. 4 is a flowchart that illustrates an example method for operating direct memory access control device 40 for at least one computing unit 20 or 20_1 through 20_$n$ having working memory 30 or 30_1 through 30_$n$, direct memory access control device 40 having a terminal for connecting direct memory access control device 40 to bus system 12 that connects computing unit 20 or 20_1 through 20_$n$ to working memory 30 or 30_1 through 30_$n$. The method includes the following steps: reading out 102 of first data from source module 50 connected to bus system 12, the first data being assigned to at least one information block 60 stored at least temporarily in source module 50; ascertaining 104 of a target address 82' in working memory 30 or 30_1 through 30_*n* for the at least one information block 60 as a function of the first data and as a function of configuration information 42; and transmission 108 of the at least one information block 60 from source module 50 to target address 82', using a direct memory access by source module 50 to working memory 30. The associated blocks in each case are shown by a solid line in FIG. 4.

In a specific embodiment, in block 104 target address 82' is ascertained as a function of at least one absolute first memory address in working memory 30 or 30_1 through 30_*n* and/or at least one relative second memory address in working memory 30 or 30_1 through 30_*n*.

In a specific embodiment of the method, source module 50 includes a communication module 50, in particular a CAN module, an MCAN module, a FlexRay module, and/or an Ethernet module. In a further specific embodiment, the source module can also include, or be, a memory, e.g., a working memory (RAM).

In a specific embodiment, the first data are useful data and/or metadata of information block 60.

In a specific embodiment, information block 60 in source module 50 characterizes a message received by source module 50.

In a specific embodiment, direct memory access control device 40 receives a trigger signal, a control bit, or some other signal from source module 50, whereby direct memory access control device 40 is caused to carry out the reading out 102 of the first data from source module 50 connected to bus system 12. This is characterized by a block 100 shown in a dashed outline.

In a specific embodiment of the method, in addition to the ascertaining 104 of target address 82', a computing unit 20_1 through 20_*n* intended for the transmission of the at least one information block 60 and/or a working memory 30_1 through 30_*n* intended for the transmission of the at least one information block 60 is ascertained. This is characterized by a block 106 shown in a dashed outline.

In a specific embodiment, at least one control bit is set in the at least one information block 60 and/or an interrupt request is triggered at computing unit 20 and/or at a processor core 20_1 through 20_*n* of computing unit 20. This is characterized by a block 110 shown in a dashed outline.

In a specific embodiment, direct memory access control device 40 is fashioned to transmit a control bit, or acknowledge bit, to source module 50, after a respective information block 60 has successfully been transmitted from source module 50 to working memory 30 by direct memory access control device 40. In this way, a memory region reserved in source module 50 temporarily for information block 60 can advantageously quickly be released again, and is thus available for possible further transmissions. This is characterized by a block 112 shown in a dashed outline.

What is claimed is:

1. A direct memory access control device for at least one computing unit, the direct memory access control device comprising:
    a terminal for connecting the direct memory access control device to a bus system that connects the computing unit to a working memory; and
    processing circuitry, wherein the processing circuitry is configured to:
        receive, from a source module connected to the bus system, a trigger signal;
        read out, from the source module in response to the received trigger signal, first data of at least one information block stored at least temporarily in the source module;
        ascertain a target address in the working memory for the at least one information block as a function of the read out first data and of configuration information;
        transmit the at least one information block from the source module to the target address, using a direct memory access by the source module to the working memory.

2. The direct memory access control device of claim 1, wherein the source module includes a communication module.

3. The direct memory access control device of claim 1, wherein the source module includes a CAN communication module.

4. The direct memory access control device of claim 1, wherein the source module includes an MCAN communication module.

5. The direct memory access control device of claim 1, wherein the source module includes a FlexRay communication module.

6. The direct memory access control device of claim 1, wherein the source module includes an Ethernet communication module.

7. The direct memory access control device of claim 1, wherein the first data includes metadata of the information block.

8. The direct memory access control device of claim 1, wherein the information block in the source module characterizes a message received by the source module.

9. The direct memory access control device of claim 1, wherein the configuration information is localized inside the direct memory access control device.

10. The direct memory access control device of claim 1, wherein the configuration information is localized outside the direct memory access control device.

11. The direct memory access control device of claim 1, wherein the processing circuitry is configured to ascertain at least one of a computing unit and a working memory intended for the transmission of the at least one information block.

12. The direct memory access control device of claim 1, wherein the processing circuitry is configured to ascertain the target address as a function of at least one absolute memory address in the working memory.

13. The direct memory access control device of claim 1, wherein the processing circuitry is configured to ascertain the target address as a function of at least one relative memory address in the working memory.

14. The direct memory access control device of claim 1, wherein the processing circuitry is configured to set at least one control bit in the at least one information block.

15. The direct memory access control device of claim 1, wherein the processing circuitry is configured to trigger an interrupt request at the computing unit.

16. The direct memory access control device of claim 1, wherein the processing circuitry is configured to trigger an interrupt request at a processor core of the computing unit.

17. An operation method of a direct memory access control device for at least one computing unit, the direct memory access control device having a terminal for connecting the direct memory access control device to a bus system that connects the computing unit to a working memory, the method comprising:
    receiving, from a source module connected to the bus system, a trigger signal;
    reading out, in response to the received trigger signal, by the direct memory access control device and from the source module, first data of at least one information block stored at least temporarily in the source module;

ascertaining, by the direct memory access control device, a target address in the working memory for the at least one information block as a function of the read out first data and as a function of configuration information; and transmitting, by the direct memory access control device, the at least one information block from the source module to the target address using a direct memory access from the source module to the working memory.

18. The method of claim 17, wherein the source module includes a communication module.

19. The method of claim 17, wherein the first data includes metadata of the information block.

20. The method of claim 17, wherein the information block in the source module characterizes a message received by the source module.

21. The method of claim 17, further comprising ascertaining at least one of a computing unit and a working memory intended for the transmission of the at least one information block.

22. The method of claim 17, wherein the target address is ascertained as a function of at least one of (a) at least one absolute first memory address in the working memory and (b) at least one relative second memory address in the working memory.

23. The method of claim 17, further comprising at least one of setting at least one control bit in the at least one information block and triggering an interrupt request at the computing unit or at a processor core of the computing unit.

* * * * *